United States Patent
Simon Bacardit

[11] Patent Number: 5,881,627
[45] Date of Patent: Mar. 16, 1999

[54] PNEUMATIC BOOSTER WITH PNEUMATIC REACTION

[76] Inventor: Juan Simon Bacardit, C/O Alliedsignal 126 Rue De Stalingrad, Drancy, France, 93700

[21] Appl. No.: 612,878
[22] PCT Filed: Feb. 22, 1996
[86] PCT No.: PCT/FR96/00282
    § 371 Date: Mar. 8, 1996
    § 102(e) Date: Mar. 8, 1996
[87] PCT Pub. No.: WO96/30245
    PCT Pub. Date: Oct. 3, 1996

[30] Foreign Application Priority Data
Mar. 31, 1995 [FR] France ..................... 95 03839

[51] Int. Cl.⁶ .................................................. F15B 9/10
[52] U.S. Cl. ............................................ 91/369.1; 92/98 R
[58] Field of Search ............................. 91/364.1, 376 R; 92/98 R, 99, 100

[56] References Cited
U.S. PATENT DOCUMENTS 4,426,915  1/1984  Maucher et al. ................ 92/99 X
5,027,693  7/1991  Wilkinson ........................ 92/97

FOREIGN PATENT DOCUMENTS 0151028  8/1985  European Pat. Off. .
2038385  2/1971  Germany .
2316894  10/1973 Germany ..................... 91/369.1
1393529  5/1975  United Kingdom ............ 92/48

Primary Examiner—Hoang Nguyen
Attorney, Agent, or Firm—Leo H. McCormick, Jr.; Warren Comstock

[57] ABSTRACT

A pneumatic booster utilizing first and second sources of air pressure and having a rigid casing (1) divided by a leaktight moving partition (2) into at least first and second working chambers (T1,T2). The moving partition (2) being urged by a pressure difference between the pressures supplied to the first and second working chambers (T1,T2) brought about by actuation of a three-way valve (5). The three-way valve (5) being retained in a pneumatic piston (4) carried by the moving partition (2). The moving partition (2) having a rigid skirt (3) including first and second walls (31,32) to define a fixed volume (V). The fixed volume being split into first and second reaction chambers (R1,R2) by a divider (11). The divider (11) constituting, within the booster, a reaction member intended to oppose an input force for actuating the three-way (5) to actuate the booster and develop an output force for the booster.

4 Claims, 1 Drawing Sheet

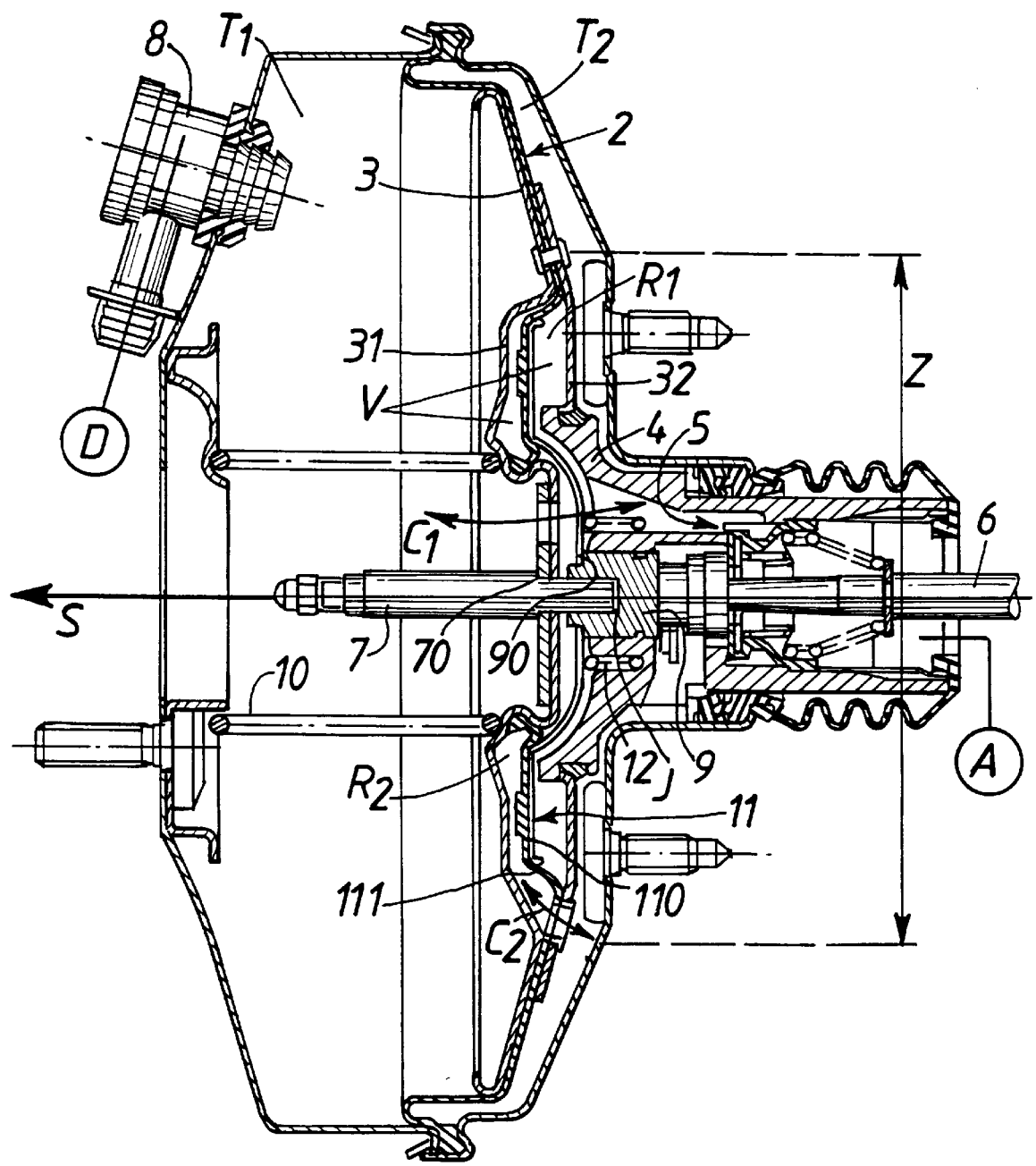

PNEUMATIC BOOSTER WITH PNEUMATIC REACTION

The present invention relates to a pneumatic booster, especially one which can be used to boost the braking in motor vehicles, comprising: a rigid casing divided in leaktight fashion into at least two working chambers, the first of which is connected to a first pressure source delivering a first pressure, and the second of which can be connected selectively, by means of a three-way valve, to the first source or to a second pressure source delivering a pressure different from the first; a moving partition delimiting the two working chambers inside the casing and including a rigid skirt, it being possible for this moving partition to be urged by a boost force resulting from a difference in pressure set up selectively between the two working chambers by actuation of the three-way valve; a pneumatic piston integral with the skirt and containing the three-way valve; an operating rod also accommodated in the piston and able to receive an input force controlling the actuation of the three-way valve; a push rod able to slide in a first axial direction with respect to the operating rod and able to receive, in order to transmit it on, an output force which is orientated in this first axial direction and is composed of the input force and of the boost force; and reaction means interposed between the operating rod and the push rod in order to apply to the operating rod, counter to the input force, a reaction which increases with the boost force.

BACKGROUND OF THE INVENTION

Devices of this type, well known in the prior art, are applied to a very great number of motor vehicles these days to provide assistance with braking.

These devices generally use a reaction disc formed of an elastomeric material, by way of essential reaction means, and this is entirely satisfactory and will undoubtedly continue to be so for a long time.

Such a device is for instance disclosed in document EP-A-0 151 028 which pertains to a tandem booster, i.e. a booster equipped with two amplification stages, the second of which is incorporated into the rigid skirt and controlled in pressure by an electronic circuit, the single reaction means of this tandem booster being nevertheless constituted by a traditional reaction disc formed of an elastomeric material.

However, and despite the traditional nature of the techniques involved, boosters continue to be the subject of substantial amounts of research aiming to optimize their operating characteristics.

SUMMARY OF THE INVENTION

Included among this research there feature especially current attempts at improving the definition of the dynamic performance of boosters, and more precisely at reducing the tolerances on those of their operating characteristics which are liable to vary as a function of the speed with which they are actuated. The present invention falls within this context, and its object is to provide a booster which, for mass-production, has greater reproducibility of operation than current boosters.

To this end, the booster of the invention is essentially characterized in that the reaction means comprise: a fixed volume defined, in a central region of the skirt, between first and second rigid walls with which this skirt is equipped and which point respectively towards the first and second working chambers; a moving divider dividing the fixed volume into first and second reaction chambers respectively delimited in part by the second and first rigid walls; and first and second communications respectively connecting the first working chamber and first reaction chamber together, and connecting the second working chamber and second reaction chamber together, the first rigid wall of the skirt being shaped so that it can, at least indirectly, carry the push rod along in the first axial direction, and the divider being shaped so that Such a device is for instance disclosed in document EP-A-0 151 028 which pertains to a tandem booster, i.e. a booster equipped with two amplification stages, the second of which is incorporated into the rigid skirt and controlled in pressure by an electronic circuit, the single reaction means of this tandem booster being nevertheless constituted by a traditional reaction disc formed of an elastomeric material.

However, and despite the traditional nature of the techniques involved, boosters continue to be the subject of substantial amounts of research aiming to optimize their operating characteristics.

Included among this research there feature especially current attempts at improving the definition of the dynamic performance of boosters, and more precisely at reducing the tolerances on those of their operating characteristics which are liable to vary as a function of the speed with which they are actuated. The present invention falls within this context, and its object is to provide a booster which, for mass-production, has greater reproducibility of operation than current boosters.

To this end, the booster of the invention is essentially characterized in that the reaction means comprise: a fixed volume defined, in a central region of the skirt, between first and second rigid walls with which this skirt is equipped and which point respectively towards the first and second working chambers; a moving divider dividing the fixed volume into first and second reaction chambers respectively delimited in part by the second and first rigid walls; and first and second communications respectively connecting the first working chamber and first reaction chamber together, and connecting the second working chamber and second reaction chamber together, the first rigid wall of the skirt being shaped so that it can, at least indirectly, carry the push rod along in the first axial direction, and the divider being shaped so that it can, at least indirectly, carry the operating rod it can, at least indirectly, carry the operating rod along in a direction which is the opposite direction to the first axial direction.

Furthermore, and according to a preferred embodiment, the booster of the invention may comprise a prestressed spring interposed between the divider and the pneumatic piston.

Finally, the moving partition and the moving divider advantageously comprise a flexible diaphragm common to this partition and to this divider.

Other features and advantages of the invention will emerge clearly from the description thereof given hereafter by way of non-limiting indication with reference to the single appended FIGURE which is a sectional view through a booster in accordance with the invention.

In a way known per se, this pneumatic booster comprises a rigid casing 1, a moving partition 2 including a rigid skirt 3, a pneumatic piston 4, a three-way valve 5, an operating rod 6, a push rod 7, and reaction means interposed between the control rod 6 and push rod 7, and which more specifically form the subject of the invention.

The moving partition 2 divides the internal volume of the rigid casing 1 in leaktight fashion into two working chambers T1 and T2 of complementary and variable volume.

The first working chamber T1 is connected to a low pressure source D via a non-return valve 8, and the second working chamber T2 can be connected selectively, by means of the three-way valve 5, either to the low pressure source D, or to a source A of relatively high pressure, for example the atmosphere.

By virtue of this arrangement which is known per se, actuation of the three-way valve 5 which connects the second working chamber T2 to the second source A causes a pressure difference between the two working chambers T1 and T2, the moving partition 2 thus finding itself urged by a force which represents the boost force of the booster, and moving inside the casing 1 against the force exerted by a spring 10, carrying the pneumatic piston 4 integral with the skirt 3 along with it.

In practice, the three-way valve 5 is borne by the piston 4, and it is made to open to the working chamber T2 by applying an input force in the axial direction S to the operating rod 6, this rod itself being borne by the piston 4 and ending in a feeler 9.

The push rod 7 is mounted so as to be able to slide, in the axial direction S, relative to the operating rod 6, and can receive an output force also orientated in the axial direction S, this output force being transmitted on to a master cylinder (not represented), and being composed of the input force and of the boost force.

As explained previously, the invention relates more specifically to the so-called "reaction" means which are interposed between the operating rod 6 and the push rod 7, in order to apply to the operating rod, against the input force, a reaction which increases with the boost force.

According to the invention, these reaction means comprise: a fixed volume V defined, in a central region Z of the skirt 3, between two rigid walls 31, 32 of this skirt 3; a moving divider 11 dividing the fixed volume V into two reaction chambers R1 and R2; a first communication C1 connecting the working chamber and reaction chamber T1 and R1 together, and a second communication C2 connecting the working chamber and reaction chamber T2 and R2 together.

As the figure shows, the rigid walls 31, 32 of the skirt 3, respectively pointing towards the working chambers T1 and T2 respectively delimit, in part, the reaction chambers R2 and R1, moreover separated from one another by the moving divider 11.

According to a preferred embodiment, the moving divider 11 is formed in the same way as the moving partition 2 and comprises a rigid auxiliary skirt 110 and a flexible diaphragm 111 which may, as represented in the FIGURE, be common to this divider and to the moving partition 2.

Thus, in the specific case of the booster illustrated, the communication C1 passes through the rigid wall 31 of the skirt 3 and the rigid auxiliary skirt 110, while the communication C2 passes through the rigid wall 32 of the skirt 3 and the flexible diaphragm 111.

Transmission of the boost force is ensured through the fact that the rigid wall 31 of the skirt 3 is shaped so that it can come into abutment, in the axial direction S, against a shoulder 70 of the push rod 7, and can thus carry this push rod 7 along with it in this axial direction S.

Furthermore, the application of the reaction to the operating rod 6 is ensured through the fact that the divider 11, and more specifically the rigid auxiliary skirt 110, is shaped so that it can come into abutment, in an opposite direction to the axial direction S, against a shoulder 90 of the feeler 9, and can thus carry the operating rod 6, integral with the feeler 9, along with it in an opposite direction to the axial direction S.

Finally, in the preferred embodiment of the invention, illustrated in the FIGURE, the booster further comprises a prestressed spring 12 interposed between the divider 11 and the pneumatic piston 4 in order to define the minimum value (termed "jump") of the boost force which can be produced by the booster.

The booster described operates as follows.

In the position of rest of the booster, the spring 12 which pushes the auxiliary skirt 111 back away from the piston 4 and therefore from the shoulder 90 of the feeler 9, reveals between this auxiliary skirt and this shoulder a clearance which tends to reduce as soon as an input force is applied to the operating rod 6.

Furthermore, the working chambers T1 and T2 which remain in communication with one another via the valve 5 for as long as the booster is in the position of rest, become isolated from one another as soon as the input force starts to be applied, after which the valve 5 connects the rear working chamber T2 to the atmosphere A in a way known per se.

However, according to the invention, atmospheric air also admitted progressively into the reaction chamber R2 through the communication C2 pushes the divider 11 in an opposite direction to the axial direction S until the clearance between the auxiliary skirt 111 and the shoulder 90 of the feeler 9 is taken up, the booster then adopting the position represented in the FIGURE.

Beyond this position, the moving partition 2, urged by the pressure difference created between the working chambers T1 and T2, moves in the direction S, compressing the spring 10 and applying to the push rod 7 a force which is proportional to the input force applied to the operating rod 6, the proportionality being ensured by the reaction transmitted by the divider 11 to the push rod 6 via the feeler 9.

This method of operation continues until the pressure in the chambers T2 and R2 is close to atmospheric pressure, and until the clearance J which until that time existed between the feeler 9 and the push rod 7 is taken up (saturation phase), any subsequent increase in the input force then being transmitted directly to the push rod 7 via the feeler 9 bearing directly against this rod 7.

I claim:

1. A pneumatic booster comprising: a rigid casing divided in a leaktight fashion into at least first and second working chambers, said first working chamber being connected to a first pressure source having a first pressure, said second working chamber being connected selectively by means of a three-way valve to said first pressure source or a second pressure source, said second pressure source having a pressure different from said first pressure source; a moving partition for delimiting said first and second working chambers inside the casing, said moving partition including a rigid skirt, said moving partition being urged by a difference in pressure created between said first and second working chambers resulting from actuation of said three-way valve to develop a boost force; said moving partition having pneumatic piston integrally connected to said skirt and retaining said three-way valve; an operating rod retained in said piston for receiving an input force to control the actuation of said three-way valve; an output push rod capable of sliding in a first axial direction with respect to said operating rod and connected to said moving partition for receiving an output force composed of said input force and boost force; and reaction means interposed between said operating rod and said push rod in order to apply to the operating rod a reaction force counter to said input force, said reaction force increasing as a function of said boost force, characterized in that said reaction means comprises: a fixed volume defined by a central region of said skirt located between first and second rigid walls of said skirt, said first and second rigid walls point respectively towards said first and second working chambers; a moving divider for dividing said fixed volume into first and second reaction chambers respectively delimited in part by said second and first rigid walls; and first and second communication passages respectively connecting said first working chamber and first reaction chamber together, and said second working chamber and second reaction chamber together, said first rigid wall of said skirt being shaped to carry said output push rod along in said first axial direction while said divider (11) being shaped to carry said operating rod along in a direction opposite said first axial direction.

2. The booster according to claim 1, further comprising: a prestressed spring interposed between said divider and said pneumatic piston.

3. The booster according to claim 1, wherein said moving partition and said moving divider comprise a common flexible diaphragm.

4. The booster according to claim 2, wherein said moving partition and said moving divider comprise a common flexible diaphragm.

\* \* \* \* \*